Patented Mar. 12, 1940

2,193,252

UNITED STATES PATENT OFFICE 2,193,252

ESTERS OF PHOSPHORUS ACIDS

Lucas P. Kyrides, Webster Groves, Mo., assignor to Monsanto Chemical Company, St. Louis, Mo., a corporation of Delaware No Drawing. Application May 26, 1938, Serial No. 210,157

6 Claims. (Cl. 260—461)

This invention relates to new chemical compounds and more particularly to new esters of phosphorus acids.

The principal object of this invention is the provision of novel and valuable liquid esters of phosphorus acids and hexyl phenols.

It has been found that liquid mixtures of tri (hexylphenyl) phosphites may be obtained in substantially theoretical yields by reacting an isomeric mixture of hexyl phenols with a substantially theoretical quantity of phosphorus trichloride. For many purposes a liquid mixture of such phosphites is peculiarly suited for use in the industrial arts.

A convenient method which may be utilized for the preparation of an isomeric mixture of hexyl phenols which is eminently suitable for use in this process is as follows. A commercial mixture of hexanes having a boiling range of 65–70° C. is chlorinated to the monochloro derivatives. The mixture of hexyl chlorides is then reacted with phenol to form a mixture predominately of the para alkyl derivatives but containing some ortho. This reaction may be carried out without a catalyst or in the presence of any of those commonly employed for such purposes such as zinc chloride, aluminum chloride, sulfuric acid or the like. The resulting mixture of hexyl phenols is isolated and is suitable for use in the instant invention.

As a specific example, 130 parts of phosphorus trichloride are slowly added to 535 parts of mixed hexyl phenols at 95° C. After the addition is complete, the temperature is slowly raised to 150° C. and maintained there for several hours. To complete the reaction a vacuum may be applied. The ester may be recovered from the reaction mass by dilution with an organic solvent such as benzene and extraction of the free phenol and acid esters with NaOH solution. The benzene is then removed by heating under a vacuum, the removal being accelerated if desired by the use of an entraining liquid such as a stream of dry nitrogen. The tri (hexylphenyl) phosphite is obtained as an oily, viscous liquid at ordinary temperatures.

It is preferable to use a small excess of phenol, e. g., 2% to 5%, to insure complete conversion of the PCl₃ to the ester.

For certain purposes it may be desirable to prepare the tri (hexylphenyl) phosphites by the use of theoretical quantities of reactants. Under these circumstances the reaction is forced practically to completion by the use of a vacuum and preferably an entraining gas to facilitate the removal of HCl. It will be found that the phosphite is obtained in a substantially pure condition, there being present only a very small proportion of hexyl phenol, which, for most purposes, is entirely unobjectionable. This alternative method obviates the purification step outlined above and may be employed where a technically pure product is not required.

In an analogous manner, an isomeric mixture of hexyl phenols may be used to prepare tri (hexylphenyl) phosphate by reaction with phosphorus oxychloride. If desired, any of the catalysts customarily employed for such reactions may be utilized. Alternatively, one may use the anhydrous sodium salt of the phenol and POCl₃ which are preferably allowed to react in an inert medium.

One hundred and fifty parts of phosphorus oxychloride are slowly added to five hundred and thirty-five parts of mixed hexyl phenols containing five parts of an aluminum chloride catalyst at 95° C. After the addition is complete, the temperature is slowly raised to 150° C. and maintained for several hours, after which time a vacuum may be applied to complete the reaction. The ester, a viscous oily liquid, may be recovered in the same manner as the corresponding phosphite prepared above.

The mixed tri (hexylphenyl) phosphites and the corresponding mixed tri (hexylphenyl) phosphates have been found to be valuable adjuvants adapted to be added to oils and greases.

Recent advances in the automotive engine design have tended toward higher bearing pressures, higher speeds of rotation and higher engine temperatures. Such changes have occasioned a departure from the usual metals employed for bearings and adoption of harder materials, such as cadmium-silver, cadmium-nickel, copper-lead alloys or the like. Concurrently with this change to the new bearing materials a demand has arisen for oils having a higher viscosity index, i. e., a smaller change in viscosity with change in temperature. This demand has been met by improved methods of refining which have made possible a greatly improved product. However, these improved oils have been found to be definitely corrosive toward the new bearing materials which, although they are harder than the older type, such as babbitt, are much more susceptible to such attack.

It has been found that when the compounds forming the subject matter of this invention are admixed with oils or greases in quantities as small as 1/10 of 1% or even less the tendency to corrode the newer type bearings otherwise shown by such oil or grease is substantially completely prevented. In addition, it has been found that the admixture of these compounds with oils and greases increases the film strength of the resulting product and reduces the amount of wear normally occurring when the bearing is in use over what is encountered when the oil or grease alone is used. There are also indications that the amount of carbon formed is reduced. In many cases it may be desirable to incorporate the phosphites or phosphates, in quantities as large as 1% or more, with certain oils. In fact, 4% or 5% may be employed where the object is to increase the film strength, although much smaller amounts will prevent corrosion.

When the compounds of this invention are employed for the purposes outlined, it has been found that they do not impart an objectionable odor such as "carbolic acid" to the product. Many of the derivatives of phenols previously employed for analogous purposes are subject to this objection and the widespread complaints of customers who objected to such an odor have severely limited their application.

Moreover, it has been found that the tri (hexylphenyl) phosphates prepared above are valuable plasticizers and high boiling solvents. Although they are especially valuable for use with nitrocellulose, they may also be employed with other cellulose esters such as cellulose acetate, and with other plastics such as vinyl resins and the like. For most purposes it will be found that a mixture containing about 25% of the plasticizer based on the weight of the plastic is satisfactory.

In addition it will be noted that the compositions described herein are liquids whereas such commercial materials as tertiary butyl phenol, although of lower molecular weight are solid at normal temperatures. The fact that these materials are liquids renders them peculiarly suitable for use as high boiling solvents, plasticizers, adjuvants for oils and greases and the like.

What is claimed is:

1. An isomeric mixture of tri (hexylphenyl) phosphites which is liquid at ordinary temperatures.

2. An isomeric mixture of tri (hexylphenyl) phosphates which is liquid at ordinary temperatures.

3. The liquid ester reaction product of $PCl_3$ and hexyl-substituted phenol.

4. The liquid ester reaction product of $POCl_3$ and hexyl-substituted phenol.

5. An isomeric mixture selected from the group consisting of tri (hexylphenyl) phosphites and tri (hexylphenyl) phosphates, which mixture is liquid at ordinary temperatures.

6. The liquid ester reaction product of a member of a group consisting of $PCl_3$ and $POCl_3$, and hexyl substituted phenol.

LUCAS P. KYRIDES.